United States Patent
Zhu et al.

(10) Patent No.: US 8,825,962 B1
(45) Date of Patent: Sep. 2, 2014

(54) PUSH-BASED CACHE INVALIDATION NOTIFICATION

(75) Inventors: Wei Zhu, Cupertino, CA (US); Ray C. He, Mountain View, CA (US); Luke Jonathan Shepard, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 1042 days.

(21) Appl. No.: 12/763,955

(22) Filed: Apr. 20, 2010

(51) Int. Cl.
*G06F 12/00* (2006.01)
*G06F 17/30* (2006.01)

(52) U.S. Cl.
CPC .... *G06F 17/30371* (2013.01); *G06F 17/30365* (2013.01)
USPC ............ 711/145; 709/226; 711/E12.002

(58) Field of Classification Search
CPC ................ G06F 17/30371; G06F 17/30365
USPC .......... 711/141, 145, 146, E12.002; 709/226, 709/224
See application file for complete search history.

(56) References Cited

U.S. PATENT DOCUMENTS

| | | | | |
|---|---|---|---|---|
| 7,305,672 B2 * | 12/2007 | Vincent | ......................... | 717/172 |
| 7,836,070 B2 * | 11/2010 | Forstmann | .................... | 707/769 |
| 8,356,011 B2 * | 1/2013 | Cox et al. | ...................... | 707/627 |
| 8,527,606 B2 * | 9/2013 | Yamagishi et al. | ........... | 709/217 |
| 2005/0055381 A1 * | 3/2005 | Ganesh et al. | ................. | 707/200 |
| 2005/0149922 A1 * | 7/2005 | Vincent | ......................... | 717/172 |
| 2007/0027702 A1 * | 2/2007 | Cox et al. | .......................... | 705/1 |
| 2007/0255738 A1 * | 11/2007 | D'Costa | ......................... | 707/101 |
| 2008/0281965 A1 * | 11/2008 | Zhong et al. | ................... | 709/224 |
| 2008/0307412 A1 * | 12/2008 | Marr et al. | ..................... | 717/177 |
| 2009/0049053 A1 * | 2/2009 | Barker et al. | ..................... | 707/10 |
| 2010/0142696 A1 * | 6/2010 | Zhou et al. | ............... | 379/215.01 |
| 2010/0174680 A1 * | 7/2010 | Yamagishi et al. | ........... | 707/622 |
| 2010/0312784 A1 * | 12/2010 | Boyd et al. | ..................... | 707/769 |
| 2011/0161599 A1 * | 6/2011 | Craske | .......................... | 711/141 |
| 2011/0197032 A1 * | 8/2011 | Patey | ............................. | 711/133 |

OTHER PUBLICATIONS

Ioannis T. Christou, "Load Balancing Issues in Super-Peer-based Publish/Subscribe Digital Libraries", Proceedings of the Fifth IEEE International Conference on Peer-to-Peer Computing (P2P'05). 2005.*

* cited by examiner

*Primary Examiner* — Pierre-Michel Bataille
(74) *Attorney, Agent, or Firm* — Baker Botts L.L.P.

(57) ABSTRACT

In one embodiments, one or more first computing devices receive updated values for user data associated with a plurality of users; and for each of the user data for which an updated value has been received, determine one or more second systems that each have subscribed to be notified when the value of the user datum is updated and each have a pre-established relationship with the user associated with the user datum; and push notifications to the second systems indicating that the value of the user datum has been updated without providing the updated value for the user datum to the second systems.

21 Claims, 6 Drawing Sheets

PUSH-BASED CACHE INVALIDATION NOTIFICATION

TECHNICAL FIELD

The present disclosure generally relates to cache invalidation notifications and more specifically relates a push-based cache invalidation notification scheme where the notifications are only pushed to selected entities and/or where multiple cached data are invalidated with a single notification.

BACKGROUND

Social networks, or social utilities that track and enable connections between their members (including people, businesses, and other entities), have become prevalent in recent years. In particular, social networking websites allow their members to communicate information more efficiently. For example, a member may post contact information, background information, job information, hobbies, and/or other member-specific data to a location associated with the member on a social networking website. The social networking website may store such member-specific data in a database. Often, the information provided by a member may form the member's profile and may be stored in association with the member. A member may update his stored information at any time. Other members may review the posted data by browsing member profiles or searching for profiles including specific data. The social networking websites also allow their members to associate themselves with other members, thus creating a web of connections among the members of the social networking website. These connections among the members may be exploited by the website to offer more relevant information to each member in view of the members' own stated interests in their connections.

In addition to member-specific information, social networking websites may also maintain non-member-specific information that may be used to better serve their members' needs. For example, advertisers may partner up with a social networking website to provide information on products or services to the members of the social networking website. The advertisers may target their advertisements to specific members whose interests best align with the products or services they provide. In this case, the advertisers may store information relating to specific products or services with the social networking website so it is readily available. As another example, a social networking website may maintain information on various topics that may be of interest to its members so that such information may be used in connection with servicing its members' needs.

SUMMARY

The present disclosure generally relates to cache invalidation notifications and more specifically relates a push-based cache invalidation notification scheme where the notifications are only pushed to selected entities and/or where multiple cached data are invalidated with a single notification.

In particular embodiments, one or more first computing devices receive updated values for user data associated with a plurality of users; and for each of the user data for which an updated value has been received, determine one or more second systems that each have subscribed to be notified when the value of the user datum is updated and each have a pre-established relationship with the user associated with the user datum; and push notifications to the second systems indicating that the value of the user datum has been updated without providing the updated value for the user datum to the second systems.

These and other features, aspects, and advantages of the disclosure are described in more detail below in the detailed description and in conjunction with the following figures.

DETAILED DESCRIPTION

Figure 1:
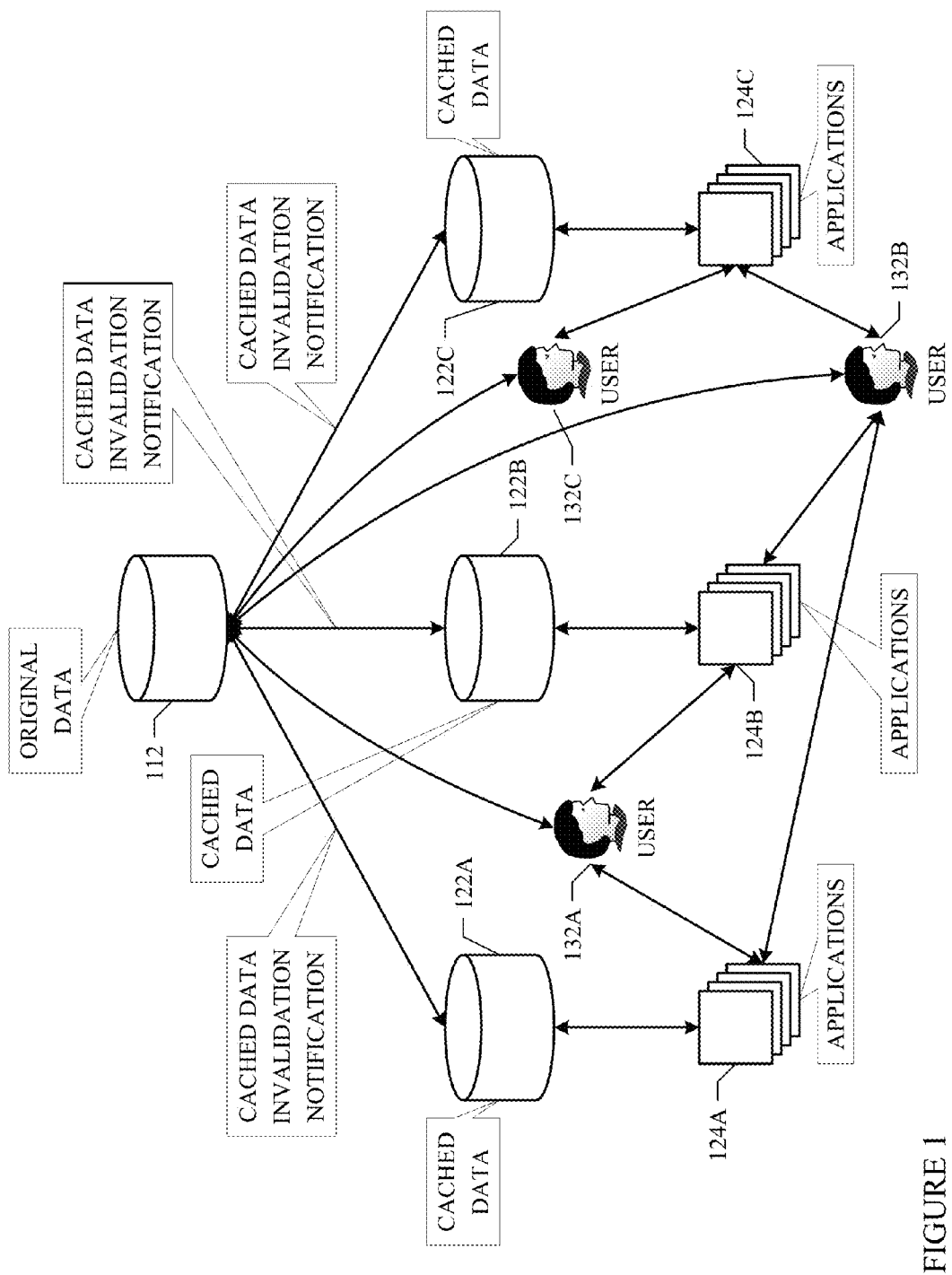
FIG. 1 illustrates an exemplary system where data are cached at multiple sites.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it and with each other through the system. Typically, to become a user of a social networking system, an entity, either human or non-human, registers for an account with the social networking system. Thereafter, the user may log into the social networking system via his account by providing, for example, his correct login ID or username and password.

When a user first registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, contact information, birth date, gender, marital status, family status, employment, education background, preferences, interests, and other demographical information to be included in his user profile. The user may identify a list of other users of the social networking system that the user considers to be his friends, and the list may be included in the user's profile. The user may identify or bookmark websites or web pages he visits frequently and these websites or web pages may be included in the user's profile. In addition to the user explicitly selecting or identifying third-party systems, relationships between a user and third-party systems may be established automatically by the social networking system (e.g., based on user actions performed in connection with the social networking system or the third-party systems).

The user may provide specific pieces of information at the time the user registers for his account or at a later time. The user may also update specific pieces of information at any time. For example, when the user moves, he may update his contact information. Or, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend. A contact may also write messages to the user's profile pages—typically known as wall-posts.

The information included in the user profile may be used to better service the user's needs. For example, the social networking system may customize the interactions of the system with a user using the information in the user's profile. Since a user profile generally includes information relating to a specific user, such information may be referred to as "user-specific information" or "user data". In particular embodiments, the user data may also include data concerning the user that is related to a social network to which the user belongs, including, but not limited to, the user's stated interests, connections to other people or entities, applications, virtual credit balance, posting content, commenting, liking, online actions or activities, social graph data, and affinity/coefficient information.

In addition to the user-specific information, a social networking system may also store non-user-specific information or non-user data, such as data concerning the system itself. Such information generally is not related to any specific user, but may nevertheless be used by the social networking system in connection with providing services to its users. The non-user data usually are not stored in connection with any specific users. Similar to the user data, the non-user data may also be updated from time to time to reflect the most-recent circumstances surrounding the social networking system and its users.

Sometimes, a social networking system may partner up with one or more third-party systems so that together they may provide more services to the users of the social networking system. For example, while a social networking system's main focus is to enable its users to have social interactions with each other, the social networking system may partner up with an online gaming system whose main focus is to enables its users to play computer games on the Internet (e.g., through a web browser). The two systems each provide their own services to the users, and yet, together, they may provide more services to their users than they are able to individually. In this case, a user of the social networking system, who has an account with the social networking system already, may play the computer games provided by the partner online gaming system through his account with the social networking system and without having to register for a separate account with the online gaming system. In addition, the social networking system may share some or all of the user's information as well as some of the non-user information stored with the social networking system with the online gaming system so that the online gaming system may use such information to customize its interactions with the user and improve the game-playing experience for the user.

To support such interactions, the social networking system may support a set of application programming interfaces (APIs) that allow third party sites controlled access to user data. In particular embodiments, when a social networking system shares its stored user or non-user data with its partner third-party systems, the third-party systems may each store a copy of the shared data locally (i.e., the third-party systems may cache the shared data for themselves). This may help improve the performance of the systems as the third-party systems do not need to retrieve the shared data from the social networking system each and every time the shared data are needed but may use their own cached copies of the shared data instead.

FIG. 1 illustrates an exemplary system where shared data are cached at multiple third-party systems partnered with a social networking system. In particular embodiments, a database 112 is associated with a social networking system. Database 112 may include any number of storage units. The social networking system may store its user and/or non-user data in database 112. In particular embodiments, the data stored in database 112 are the original copy of the data of the social networking system. Updating the values of the data stored in database 112 is done through the social networking system. In particular embodiments, the social networking system may share some or all of the data stored in database 112 with one or more third-party systems.

In particular embodiments, database 112 may be communicatively connected with one or more databases, storage units, memory cache, or other suitable types of data stores, such as databases 122A, 122B, and 122C, associated with the third-party systems. Each of databases 122A, 122B, and 122C may include any number of storage units. In particular embodiments, each of databases 122A, 122B, and 122C is associated with a third-party system partnered with the social networking system. In particular embodiments, each third-party system may provide various services in the form of software applications and more specifically, network-based software applications that may be executed in connection with client applications, such as web browsers, as well as extensions and plug-ins to such web browsers. For example, the third-party system associated with database 122A may provide a set of network-based software applications 124A; the third-party system associated with database 122B may provide a set of network-based software applications 124B; and the third-party system associated with database 122C may provide a set of network-based software applications 124C.

The social networking system may have one or more users, such as users 132A, 132B, and 132C. Each of users 132A, 132B, and 132C may have registered for an account with the social networking system and may have an associated user profile that includes information (i.e., user data) relating to user 132A, 132B, or 132C. In particular embodiments, the user data may be stored in database 112. Users 132A, 132B, and 132C may update, or have updated by others, various aspects of their user-specific information stored in database 112 through the social networking system at any time. In addition, the non-user data stored in database 112 may also be updated through the social networking system at any time.

In particular embodiments, users 132A, 132B, and 132C may interact with any of software applications 124A, 124B, 124C provided by the third-party systems. In particular embodiments, as users of the social networking system, users 132A, 132B, and 132C may interact with any of software applications 124A, 124B, 124C through their respective accounts with the social networking system. In particular embodiments, when a user of the social networking system interacts with a partner third-party system or with a software application provided by the third-party system, the social networking system may share some or all of the user data associated with the user and/or some of the non-user data stored in database 112 with the third-party system or with the software application with which the user interacts so that the third-party system or the software application may utilize the shared user and/or non-user data to improve (e.g., customize) its interactions with the user and/or to verify or authenticate the user. For example, when user 132A interacts with one of software applications 124A, the social networking system may share some of the user data of user 132A stored in database 112 with the one of software applications 124A with which user 132A interacts.

In particular embodiments, when the social networking system shares its user or non-user data with a third-party system or with a software application provided by the third-party system, the third-party system may choose to store a copy of the shared data locally in the database associated with the third-party system (i.e., locally caching the shared data). The cached copy of the shared data may be accessible to the software applications provided by the third-party system. For example, when the social networking system shares some of the data stored in database 112 with any of software applications 124A, a copy of the shared data may be stored in database 122A; when the social networking system shares some of the data stored in database 112 with any of software applications 124B, a copy of the shared data may be stored in database 122B; and when the social networking system shares some of the data stored in database 112 with any of software applications 124C, a copy of the shared data may be stored in database 122C. In particular embodiments, the data stored in databases 122A, 122B, and 122C are the cached copies of the shared data of the social networking system, whose original copies are stored in database 112.

The data stored in database 112 may be updated from time to time through the social networking system. In particular embodiments, although some of the data stored in database 112 may be shared with the third-party systems, the shared data may only be updated through the social networking system and may not be updated through any of the third-party systems. Users 132A, 132B, 132C may update their respective user data stored in database 112 at any time by, for example, logging into their accounts with the social networking system and updating their profiles, such as to add, change or subtract profile information, such as birth dates, profile pictures, preferences and declared interests. The non-user data stored in database 112 may be updated by the social networking system as time passes and circumstances change.

In particular embodiments, each datum of the social networking system may have a type or a name and a value. The type of the datum may indicate the nature of the datum or what the datum represents. For example, a datum may represent the address of a user. In this case, the type of the datum may be "user address" and the value of the datum may be the actual address of each user (e.g., "1000 Main Street, San Francisco, Calif."). Thus, although each user may have the same user-address datum in his profile, the value of the user-address datum may differ from user to user. As another example, a datum may represent the date of birth of a user. In this case, the type of the datum may be "user birthday" and the value of the datum may be the actual birth date of each user (e.g., "Jan. 10, 1970"). The value of each datum may change at any time. Typically, when a datum is updated, its value changes. The value may also correspond to a media object, such as a profile picture, or a uniform resource indicator to the media object.

When a particular datum stored in database 112 has been updated (i.e., the datum has a new value) either by a user or by the social networking system, if the datum has been shared with one or more third-party systems and copies of the datum have been cached locally by the third-party systems and stored in the databases (e.g., databases 122A, 122B, or 122C) associated with the third-party systems, then the social networking system may need to notify the third-party systems that their cached copies of the datum are no longer valid. In particular embodiments, the social networking system may employ a push-based notification scheme and push a cache invalidation notification to each of the third-party systems under the circumstance.

In particular embodiments, a social networking system may be partnered with one or more third-party systems and may share some of its data with the individual third-party systems. In particular embodiments, the third-party systems may store cached copies of the shared data locally. When the value of a datum has been changed through the social networking system either directly or indirectly, if the datum has been shared with one or more third-party systems and copies of the datum have been cached locally by the third-party systems, then the social networking system may notify the third-party systems that their cached copies of the datum and more specifically, their cached values of the datum are no longer valid.

However, a social networking system may store and share many types of user or non-user data, and a third-party system may not be interested in all of the data provided by the social networking system and thus may not choose to cache all of the shared data. In addition, different third-party systems may choose to receive and cache different types of data provided by the social networking system. For example, an online gaming system may be more interested in the users' ages and hobbies but may not be overly concerned with the users' addresses or marital status. As a result, the online gaming system may not wish to be notified when a user's address or marital status has changed but may want to be notified when the user's hobbies, profile picture, or friends have changed. In contrast, a financial service system may be more interested in the users' ages and employment status but may not be interested in the user's hobbies. As a result, the financial service system may choose to be notified only when a user's employment status has changed.

On the other hand, from the user's point of view, a user may or may want wish to share his information with third-party systems, or a user may wish to share his information only with some specific third-party systems. In particular embodiments, a user may control whether his information is shared with other users or third-party systems through privacy settings associated with his user profile. For example, a user may select a privacy setting for each user datum associated with the user. The privacy setting defines, or identifies, the set of entities (e.g., other users, connections of the user, or third parties) that may have access to the user datum. In particular embodiments, the privacy setting may be specified on various levels of granularity, such as by specifying particular entities in the social network (e.g., other users) or associated with the social networking (e.g., third party systems), predefined groups of the user's connections, a particular genre of connections, all of the user's connections, all connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

In particular embodiments, a privacy settings engine may be included in a social networking system. The privacy settings engine can receive privacy settings selections from each user. The privacy settings engine can save the privacy setting selections to a profile associated with the user. Once the privacy setting selections are selected by the user, the privacy settings engine can generate a privacy summary for the user that explains to the user what each of the privacy settings selections means with respect to what other users or third-party systems can access about the user that selected the privacy settings. A privacy setting thus enables a user to hide specific content items from certain connections (e.g., other users or third-party systems), or to target specific content items to a particular audience, focusing content delivery to identified individual or groups of connections chosen by the user. A connection not identified by a privacy setting will be blocked from viewing or otherwise accessing the content item. Privacy settings are also described more generally in U.S. Patent Application Publication No. 2009/0013413, which is hereby incorporated by reference in its entirety and for all purposes.

In particular embodiments, each third-party system may subscribe with the social networking system the specific types of user or non-user data it wishes to be notified when those types of data are updated. Different third-party systems may subscribe to different types of data for update notification. Thereafter, when a datum is updated (i.e., having a new value), the social networking system may determine which of the third-party systems have subscribed to be notified when this particular type of data is updated, and push a notification to a third-party system only if the third-party system has subscribed to be notified for the type of data to which the datum belongs. For example, suppose the online gaming system has subscribed with the social networking system for notification for changes to the users' friends. If a user has updated his address, then the online gaming system is not notified of the update, because the online gaming system has not subscribed for notification for users' addresses. On the other hand, if a user has added a friend, then the online gaming system is notified of the update. In the implementations described herein, the notifications identify a user and the type or data field that has been changed. In some implementations, the notifications only signal a change to the type of data, but does not include the changed data itself.

In practice, a social networking system may have a great number of users (e.g., thousands or millions or hundreds of millions). These users may often update some of their stored user data, especially those user data whose values may change frequently (e.g., interests, hobbies, friends, etc.). Similarly, some of the stored non-user data may be updated often as well because circumstances surrounding the social networking system and its users may also change frequently. In addition, for each datum that is updated, multiple third-party systems may have subscribed to be notified. Thus, if a notification is pushed to the third-party systems each and every time a datum is updated, the social networking system may need to push a great number of notifications to the third-party systems frequently, which may negatively affect the performance of the social networking system and the third-party systems. In particular embodiments, the social networking system may notify each third-party system of multiple data updates with a single push notification in order to decrease the number of notifications pushed to each third-party system.

Figure 2:
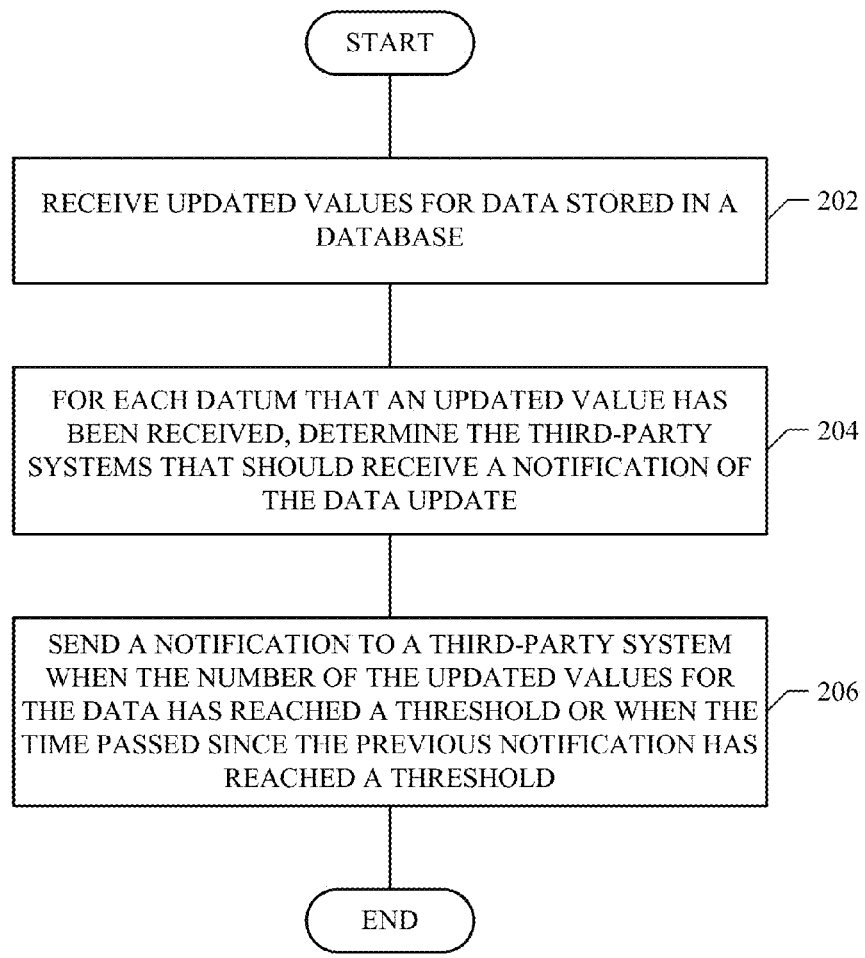
FIG. 2 illustrates an exemplary method for pushing notifications to entities that have subscribed to be notified when the values of data are updated.

FIG. 2 illustrates an exemplary method for pushing notifications to third-party system that have subscribed to be notified when the values of the data of a social networking system are updated. In particular embodiments, a social networking system may receive updated values of user or non-user data stored in a database (e.g., database 112 of FIG. 1) associated with the social networking system (step 202 of FIG. 2). The data updates may be received from the users of the social networking systems (e.g., user demographical information) or may be determined by the social networking system (e.g., user activities or non-user information).

Figure 3:
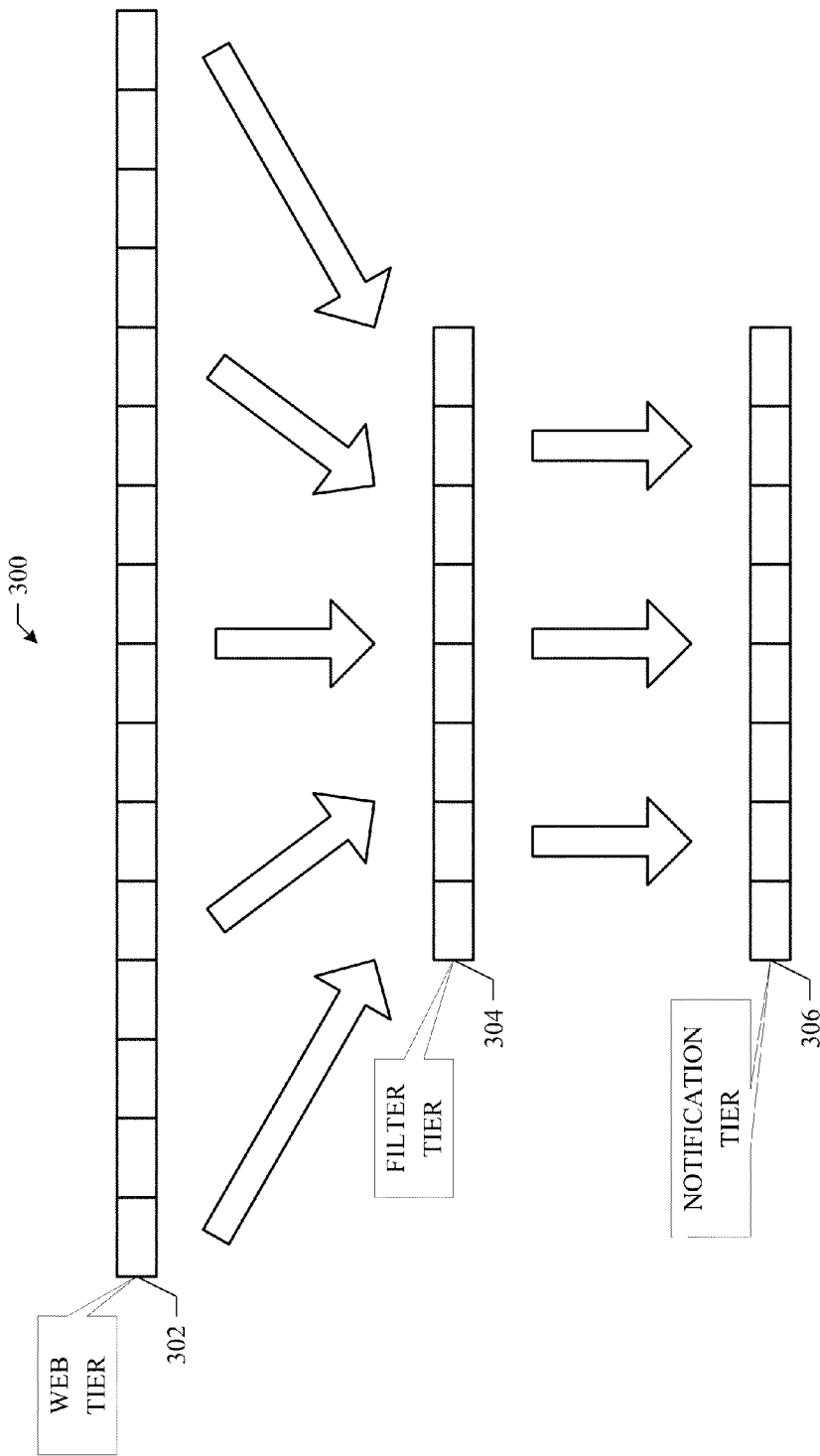
FIG. 3 illustrates an exemplary multi-tier architecture for determining which entities should be notified when the values of data are updated.

Because the social networking system may have a great number of users and many of its users may interact with the social networking system at the same time, it is possible that the social networking system may receive multiple data updates at the same time. To ensure that the users may interact with the social networking system without experiencing unnecessary delays, in particular embodiments, the social networking system may employ a multi-tier architecture, an example of which is illustrated in FIG. 3, for notifying the third-party systems when specific data of the social networking system are updated.

In particular embodiments, a multi-tier architecture 300 may include three tiers. The first, top tier 302 is a web tier. Tier 302 may include a relatively large number of computing devices (e.g., servers) responsible for interacting with the users of the social networking system. When a user logs into his account with the social networking system, the user may be served by any one of the servers of tier 302. However, typically the user is not aware of with which server of tier 302 he interacts each time he logs into his account. To the user, he interacts with the social networking system itself. When a user updates one of his user data (step 202 of FIG. 2), the update notice of the datum is received by the server of tier 302 with which the user interacts at that time. In particular embodiments, the server of tier 302, upon receiving a data update from a user, may store the updated value of the datum in the database (e.g., database 112 of FIG. 1) associated with the social networking system, and then forward the data update to the second, middle tier 304 to be further processed. Alternatively, in other embodiments, upon receiving a data update from a user, the server of tier 302 may just send an asynchronous message regarding the data update to tier 304. In this case tier 302 may not be responsible for storing the updated value of the datum in the database. This function may be performed at tier 302 or by some other component of the system.

In particular embodiments, for each datum that an updated value has been received, the specific third-party systems that should be notified of the update are determined (step 204 of FIG. 2). Again, the updated datum may be a user datum or a non-user datum, and the updated value of the datum may be received from a user through a server of tier 302 or determined by the social networking system. In particular embodiments, tier 304 is responsible for determining which third-party systems should be notified when the data of the social networking system are updated.

In particular embodiments, tier 304 may include one or more computing devices (e.g., servers) responsible for filtering the data updates forwarded by tier 302 and thus is a filter tier. In particular embodiments, the number of servers of tier 304 may be less than the number of servers of tier 302. In particular embodiments, an asynchronous queue may be employed in connection with tier 304. The data updates may be put in the asynchronous queue of tier 304 and processed by the individual servers of tier 304. In particular embodiments, each time any server of tier 302 receives a data update from a user, the data update is put in the asynchronous queue. Similarly, when any component of the social networking system determines an update to a datum, the update may also be put in the asynchronous queue. The data updates in the asynchronous queue may then be processed by the servers of tier 304 one at a time. Multiple servers of tier 304 may process multiple data updates at the same time.

The social networking system may be partnered with multiple third-party systems. However, when a datum is updated, not all of the partnered third-party may need to be notified of the update. In particular embodiments, each third-party system subscribes with the social networking system for the specific types of data it wishes to be notified when the data are updated. Thus, in particular embodiments, given a datum whose value has been updated, first, a server of tier 304 processing the update may determine which ones of the third-party systems have subscribed with the social networking system for notification for the type of data to which the datum belongs. For example, if the updated datum is a particular user's address, only those third-party systems that have subscribed to be notified when users' addresses are changed may be selected to receive the update notifications.

In particular embodiments, if the updated datum is associated with a specific user (i.e., a user datum), to protect users' privacy, the subscribing third-party systems may be further filtered based on whether the user associated with the updated datum has a pre-established relationship with the subscribing third-party systems. In particular embodiments, only those subscribing third-party systems that have pre-established relationships with the user associated with the updated datum may be selected to receive the update notifications. There may be various types of relationships a user of the social networking system may establish with a third-party system. For example, the user may have interacted with the third-party system or with any of the software applications provided by the third-party system, or the user may have identified the third-party system in his user profile, or the user may have bookmarked (or otherwise added to his profile) any of the software applications provided by the third-party system.

To further illustrate, in FIG. 1, user 132A has interacted with some of software applications 124A and 124B. Thus, user 132A has established relationships with the two third-party systems providing software applications 124A and 124B. User 132C has only interacted with some of software applications 124C. Thus, user 132C has established a relationship with the one third-party system providing software applications 124C. User 132B has interacted with some of software applications 124A, 124B, and 124C. Thus, user 132B has established relationships with the three third-party systems providing software applications 124A, 124B, and 124C.

Another way to protect users' privacy is to consider each user's privacy settings when sharing the user's data with third-party systems. In particular embodiments, when a user has updated one of his user data, the server of tier 304 processing the update may further examine the user's privacy settings. If, according to the user's privacy settings, the user has agreed to share this particular datum with any third-party systems, then the data update is included in a notification that will be sent to the third-party systems at some time in the future. On the other hand, if the user has specified not to share this particular datum with any third-party systems under all circumstances, then the data update is not included in any notification sent to the third-party systems. For example, one of the user data associated with a user may be the user's email address. A user may or may not grant a third-party system access to his email address by specifying the privacy setting for the email address. If a user has updated his email address, the server of tier 304 that processes the update may check whether a third-party system has access to the user's email address based on the user's privacy settings. This update is only included in a notification to a third-party system only if the user has granted the third-party system access to his email address based on the user's privacy settings.

To summarize, in particular embodiments, given a datum whose value has changed, if the datum is associated with a specific user (e.g., a user datum), then only those third-party systems that have subscribed for notification for the data type to which the datum belongs and have pre-established relationships with the user are selected to be notified of the update to the datum. If the datum is not associated with any specific user (e.g., a non-user datum), then only those third-party systems that have subscribed for notification for the data type to which the datum belongs are selected to be notified of the update to the datum. Once a server of tier 304 has determined which third-party systems should receive notifications for an update to a datum, the server may forward all the information to the third, bottom tier 306.

In particular embodiments, to decrease the number of notifications pushed to the third-party systems, for each third-party system, a notification is pushed to the third-party system only when the number of data updates for which the third-party system should be notified has reached a threshold or when the time passed since the last notification pushed to the third-party has reached a threshold or when the time that has passed since the previous notification has reached a threshold (step 206).

In particular embodiments, tier 306 may include one or more computing devices (e.g., servers) responsible for pushing notifications to the individual third-party systems. In particular embodiments, the number of servers of tier 306 may be similar or less than the number of servers of tier 304. In particular embodiments, the information from tier 304 may be temporarily stored with tier 306 until notifications are pushed to the third-party systems.

In particular embodiments, for each datum that has been updated, a server in tier 304 may determine which specific third-party systems need to be notified of the update. As the system operates, for each third-party system, the data updates for which the third-party should be notified accumulate, and the number of data updates for which the third-party system should be notified increases. Note that during a given time period, different third-party systems may accumulate different numbers of data updates for which the third-party systems should be notified.

In particular embodiments, two threshold values may be used to determine when a notification should be pushed to each third-party system. First, for each third-party system, if the number of data updates for which the third-party system should be notified has reached a threshold value (e.g., 1000 data updates), then a notification is pushed to the third-party system. Second, for each third-party system, if the amount of time that has passed since the previous notification pushed to the third-party system has reached a threshold value (e.g., 5 seconds), then a notification is pushed to the third-party system. In particular embodiments, the two threshold values may be combined so that for each third-party system, when either threshold has been reached, a notification is pushed to the third-party system.

Sometimes, it is possible that a third-party system may have subscribed to be notified when certain types of data are updated. When updates occur to these types of data, the third-party system may be selected for receiving the corresponding notifications. However, before the notification is actually pushed to the third-party system, the third-party system may no longer wish to be notified about the data updates and thus may unsubscribe to be notified. In this case, the third-party system may be deselected for receiving further notifications, and no notification is actually pushed to the third-party system.

In particular embodiments, a notification pushed to each third-party system includes all the data updates accumulated for the third-party system between the previous notification and this notification. In particular embodiments, a notification only indicates to each third-party system which specific data have been updated, but does not actually provide the updated values of the data. In particular embodiments, a notification may include a timestamp and sufficient information to identify the values of what data have changed. For example, for each user datum that has been updated, the notification may include the following fields: "uid" (the identifier of the user associated with the user datum), "object" (indicating the type of data, which is "user data" in this case), "fields" (indicating the actual user datum that has been changed), and "time" (indicating the time of change). A third-party system, upon receiving a notification, may determine which of its cached data are no longer valid. The third-party system may choose to obtain the updated values of the data from the social networking system at a later time, such as when the user (using a client device) establishes a connection to the third party system in order to access a third-party application. Alternatively, in other embodiments, a notification may include the updated values of the data so that upon receiving the notification, a third-party system may have access to the current values of the data as well.

Suppose that a software application provided by a third-party system has determined, at some point in time, that it needs a datum shared by the social networking system. If the datum, including its value, has been cached locally with the third-party system (e.g., a copy of the datum has been stored in a database associated with the third-party system), then the software application may access the value of the datum from the locally cached copy of the datum. However, suppose that at some prior time, the social networking system has pushed a notification to the third-party system indicating that the value of this particular datum has been changed. In this case, the locally cached copy of the datum at the third-party system is no longer valid. The software application needs to retrieve the updated value of the datum from the social networking system. Co-pending and commonly-owned U.S. Patent Application Publication No. 2009/0182589, U.S. Patent Application Publication No. 2010/0132049, U.S. Patent Application Publication No. 2011/0022657, U.S. Patent Application Publication No. 2011/0023129, and U.S. Patent Application Publication No. 2011/0023101, all of which are incorporated by reference herein, disclose how third party systems may access user data stored on social networking system and how a user's login status may be determined. For example, in one implementation, the third party system may transmit to a client device of the user a Hyper Text Markup Language (HTML) document that includes an embedded reference (e.g., Uniform Resource Locator (URL)) for a user data item maintained by the social networking system. The client device, processing the HTML document, transmits a Hyper Text Transfer Protocol (HTTP) request to the social networking system, typically with a browser cookie appended to the request. The social networking system may access the cookie to determine the user's login state.

Figure 4:
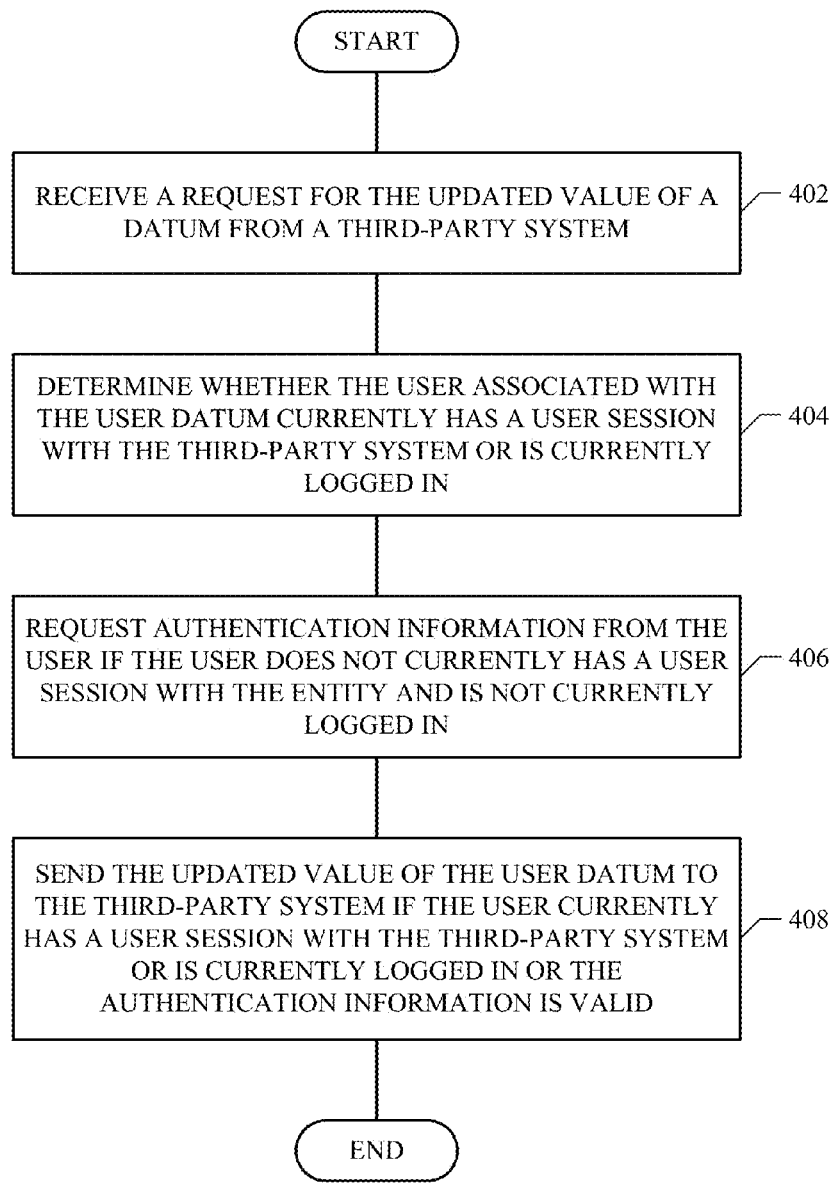
FIG. 4 illustrates an exemplary method for transmitting the updated values of data to entities.

FIG. 4 illustrates an exemplary method for a third-party system or one of the software applications provided by the third-party system to retrieve the updated values of the shared data from the social networking system. In particular embodiments, when the third-party system or a software application provided by the third-party system retrieves the update notification of a datum shared by the social networking system, the third-party system may send a request for the updated value of the datum to the social networking system (step 402). Depending on the type of the datum, the social networking system may respond to the request differently. More specifically, the requested datum may be associated with a specific user (i.e., a user datum) or may not be associated with any user (i.e., a non-user datum) of the social networking system. In particular embodiments, if the datum is not associated with any user, then the social networking system may transmit the updated value of the datum to the third-party system that has sent the request. On the other hand, if the datum is associated with a specific user, then the social networking system may need to take certain additional steps to protect the user's privacy based on privacy policies and/or settings configured by the user.

In particular embodiments, each user of the social networking system may specify preferences on how his user data should be treated with respect to sharing such data with third-party systems. For example, the user may specify his preferences through the privacy settings of his user profile. Given a specific user datum, a user may choose never to share it with any third-party systems, always freely share it with all third-party systems, only share it with certain specified, trusted third-party systems, only share it with a third-party system while the user has a current session with the third-party system (e.g., while the user is interacting with a software application provided by the third-party system), only share it with the subscribing third-party systems while the user is logged into his account with the social networking system, and so on. In other implementations, some or a subset of these privacy settings may be system-wide settings that are not subject to user-level configuration. A privacy setting thus enables a user to hide specific content items from certain entities (e.g., social connections or third-party systems), or to target specific content items to a particular audience, focusing content delivery to identified individual or groups of social connections or third-party systems chosen by the user. A social connection or third-party system not identified by a privacy setting will be blocked from viewing or otherwise accessing the content item. Privacy settings are also described more generally in U.S. Patent Application Publication No. 2009/0013413, which is hereby incorporated by reference in its entirety.

In particular embodiments, upon receiving a request from a third-party system for the current (i.e., updated) value of a user datum associated with a specific user (step 402), the social networking system may examine the privacy setting for the requested datum that has been specified by the user. The social networking system may respond to the request differently depending on the actual privacy setting for the requested datum.

If the user has indicated that this particular datum may be shared with all third-party systems at any time, the social networking system may transmit the updated value of the datum to the third-party system that has sent the request. If the user has indicated that this particular datum should never be shared with any third-party systems, the social networking system may transmit a response to the third-party system indicating that the value of the datum is not available or cannot be transmitted to any third-party system.

If the user has indicated (or a system setting indicates) that this particular datum should only be shared with a third-party system while the user currently has a session with the third-party system at the time of the request, then the social networking system may determine whether, at the time the request is made, the user currently has a user session with the third-party system (step 404). For example, when making the request, the third-party system may also send a session key for the session it has with the user. Note that a third-party system may have a session with a user through one of its software applications. The social networking system may validate the session the third-party system has with the user using the session key. If the session is valid, the social networking system may transmit the updated value of the datum to the third-party system (step 408). On the other hand, if the session key cannot be validated or if the third-party system has not provided any session key with its request, the social networking system may transmit a response to the third-party system indicating that there is an error or that the session cannot be validated.

If the user has indicated that this particular datum should only be shared with a third-party system while the user is currently logged into his account with the social networking system, then the social networking system may determine whether, at the time the request is made, the user is currently logged into his account with the social networking system (step 404). If the user is currently logged into his account, then the social networking system may transmit the updated value of the datum to the third-party system (step 408). On the other hand, if the user is not currently logged into his account, in particular embodiments, the social networking system may send a request to the user, asking the user to log into his account (step 406). If the user, in response to the request, successfully logs into his account with the social networking system, then the social networking system may transmit the updated value of the datum to the third-party system (step 408). Otherwise, the social networking system may transmit a response to the third-party system that the value of the datum cannot be provided at this time.

Figure 5:
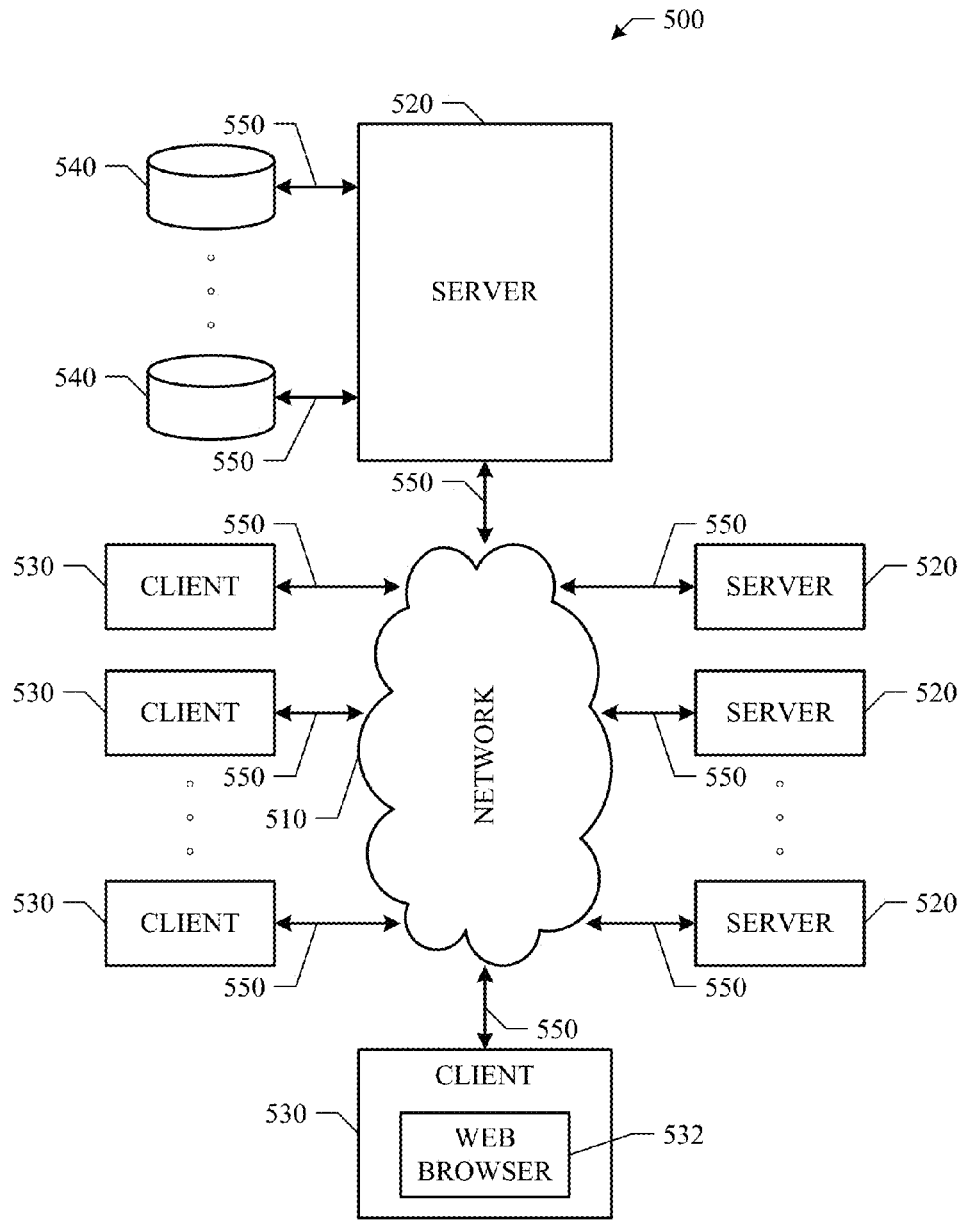
FIG. 5 illustrates an exemplary network environment.

Particular embodiments may be implemented in a network environment. FIG. 5 illustrates an example network environment 500 suitable for providing software validation as a service. Network environment 500 includes a network 510 coupling one or more servers 520 and one or more clients 530 to each other. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wireline, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more severs 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functionalities implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a URL or other address directing the web browser 532 to a server 520, and the web browser 532 may generate an HTTP request and communicate the HTTP request to server 520. Server 520 may accept the HTTP request and communicate to client 530 one or more HTML files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
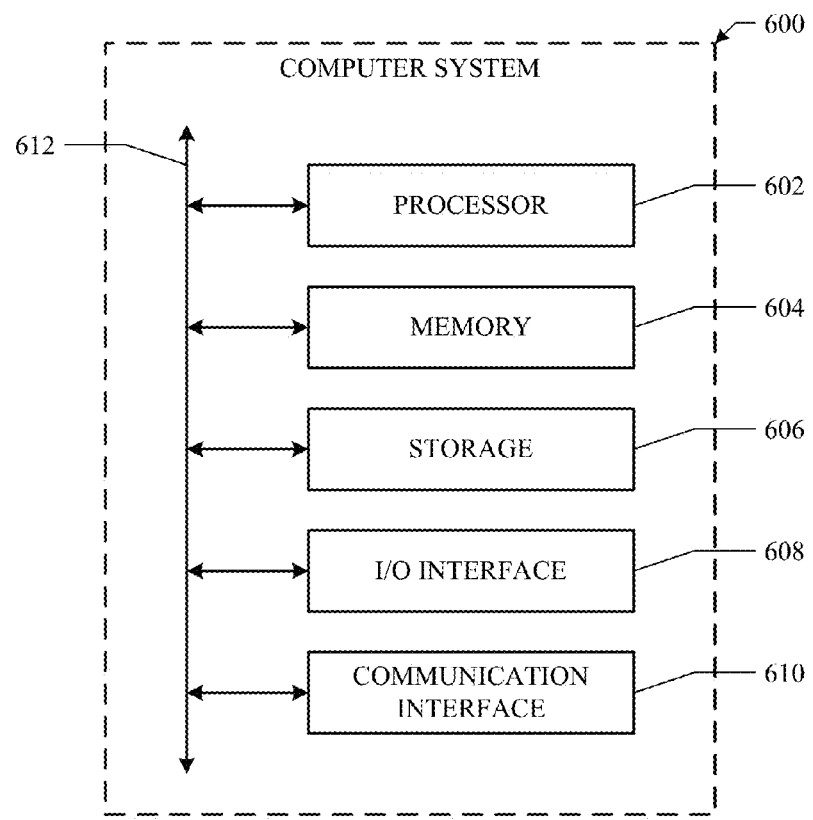
FIG. 6 illustrates an exemplary computer system.

Particular embodiments may be implemented on one or more computer systems. FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more APIs. This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
by one or more first computing devices associated with a first system, receiving updated values for user data associated with a plurality of users, the first system providing services to the plurality of users; and by one or more first computing devices, for each of the user data for which an updated value has been received:

determining one or more second computing devices associated with a third-party system other than the first system that each have subscribed to be notified when the value of the user datum is updated by the first system and each provide one or more additional services to the user associated with the user datum; and pushing notifications to the second computing devices indicating that the value of the user datum has been updated without providing the updated value for the user datum to the second computing devices.

2. The method of claim 1, further comprising:

for each of the second computing devices:

by one or more first computing devices, storing the user data for which the updated values have been received and for which the second computing device should be notified when the values of the user data are updated; and by one or more first computing devices, pushing a notification to the second computing device when the number of the stored user data has reached a predetermined threshold, wherein the notification includes all the stored user data.

3. The method of claim 1, further comprising:

for each of the second computing devices:

by one or more first computing devices, storing the user data for which the updated values have been received and for which the second computing device should be notified when the values of the user data are updated; and by one or more first computing devices, pushing a notification to the second computing device when the time that has passed since pushing a previous notification to the second computing device has reached a predetermined threshold, wherein the notification includes all the stored user data.

4. The method of claim 1, further comprising:

by one or more first computing devices, receiving, from one of the second computing devices, a request for the updated value for one of the user data associated with one of the users;

by one or more first computing devices, determining whether the user currently has a user session with the second computing device or with the first computing devices; and by one or more first computing devices, transmitting, to the second computing device, the updated value for the user datum only if the user currently has a user session with the second computing device.

5. The method of claim 1, wherein:

the users form a social network through the first computing devices; and the user data comprise profile information of the users.

6. The method of claim 1, wherein a user has a pre-established relationship with one of the second computing devices when the user has interacted with the second computing device, has bookmarked the second computing device of a software application provided by the second computing device, or has identified the second computing device or a software application provided by the second computing device as one of the user data associated with the user.

7. The method of claim 1, wherein each of the second computing devices subscribes to the first computing devices to be notified when the value of a user datum is updated by subscribing to a data type to which the user datum belongs.

8. A first system comprising:

one or more processors providing services to a plurality of users; and a memory coupled to the processors comprising instructions executable by the processors, the processors being operable when executing the instructions to:

receive updated values for user data associated with the plurality of users; and for each of the user data for which an updated value has been received:

determine one or more third-party systems other than the first system that each have subscribed to be notified when the value of the user datum is updated and each provide one or more additional services to the user associated with the user datum; and push notifications to the second systems indicating that the value of the user datum has been updated without providing the updated value for the user datum to the second systems.

9. The first system of claim 8, wherein the processors are further operable when executing the instructions to:

for each of the second systems:

store the user data for which the updated values have been received and for which the second system should be notified when the values of the user data are updated; and push a notification to the second system when the number of the stored user data has reached a predetermined threshold, wherein the notification includes all the stored user data.

10. The first system of claim 8, wherein the processors are further operable when executing the instructions to:

for each of the second systems:

store the user data for which the updated values have been received and for which the second system should be notified when the values of the user data are updated; and push a notification to the second system when the time that has passed since pushing a previous notification to the second system has reached a predetermined threshold, wherein the notification includes all the stored user data.

11. The first system of claim 8, wherein the processors are further operable when executing the instructions to:

receive, from one of the second systems, a request for the updated value for one of the user data associated with one of the users;

determine whether the user currently has a user session with the second system or with the first system; and transmit, to the second system, the updated value for the user datum only if the user currently has a user session with the second system.

12. The first system of claim 8, wherein:

the users form a social network through the first system; and the user data comprise profile information of the users.

13. The first system of claim 8, wherein a user has a pre-established relationship with one of the second systems when the user has interacted with the second system, has bookmarked the second system of a software application provided by the second system, or has identified the second system or a software application provided by the second system as one of the user data associated with the user.

14. The first system of claim 8, wherein each of the second systems subscribes to the first system to be notified when the value of a user datum is updated by subscribing to a data type to which the user datum belongs.

15. One or more computer-readable non-transitory storage media embodying software that is operable when executed by one or more first computing devices associated with a first system to:
receive updated values for user data associated with a plurality of users, the updated values received while the first system is providing services to the plurality of users; and
for each of the user data for which an updated value has been received:
determine one or more second computing systems associated with a third-party system other than the first system that each have subscribed to be notified when the value of the user datum is updated by the first system and each provide one or more additional services to the user associated with the user datum; and
push notifications to the second computing systems indicating that the value of the user datum has been updated without providing the updated value for the user datum to the second computing systems.

16. The media of claim 15, wherein the software is further operable when executed by the one or more first computing systems to:
for each of the second computing systems:
store the user data for which the updated values have been received and for which the second computing system should be notified when the values of the user data are updated; and
push a notification to the second computing system when the number of the stored user data has reached a predetermined threshold, wherein the notification includes all the stored user data.

17. The media of claim 15, wherein the software is further operable when executed by the one or more first computing systems to:
for each of the second computing systems:
store the user data for which the updated values have been received and for which the second computing system should be notified when the values of the user data are updated; and
push a notification to the second computing system when the time that has passed since pushing a previous notification to the second computing system has reached a predetermined threshold, wherein the notification includes all the stored user data.

18. The media of claim 15, wherein the software is further operable when executed by the one or more first computing systems to:
receive, from one of the second computing systems, a request for the updated value for one of the user data associated with one of the users;
determine whether the user currently has a user session with the second computing system or with the first computing systems; and
transmit, to the second computing system, the updated value for the user datum only if the user currently has a user session with the second computing system.

19. The media of claim 15, wherein:
the users form a social network through the first computing systems; and
the user data comprise profile information of the users.

20. The media of claim 15, wherein a user has a pre-established relationship with one of the second computing systems when the user has interacted with the second computing system, has bookmarked the second computing system of a software application provided by the second computing system, or has identified the second computing system or a software application provided by the second computing system as one of the user data associated with the user.

21. The media of claim 15, wherein each of the second computing systems subscribes to the first computing systems to be notified when the value of a user datum is updated by subscribing to a data type to which the user datum belongs.

* * * * *